June 11, 1935. A. B. MERRILL 2,004,479
TRANSMISSION BELT
Filed Oct. 24, 1933
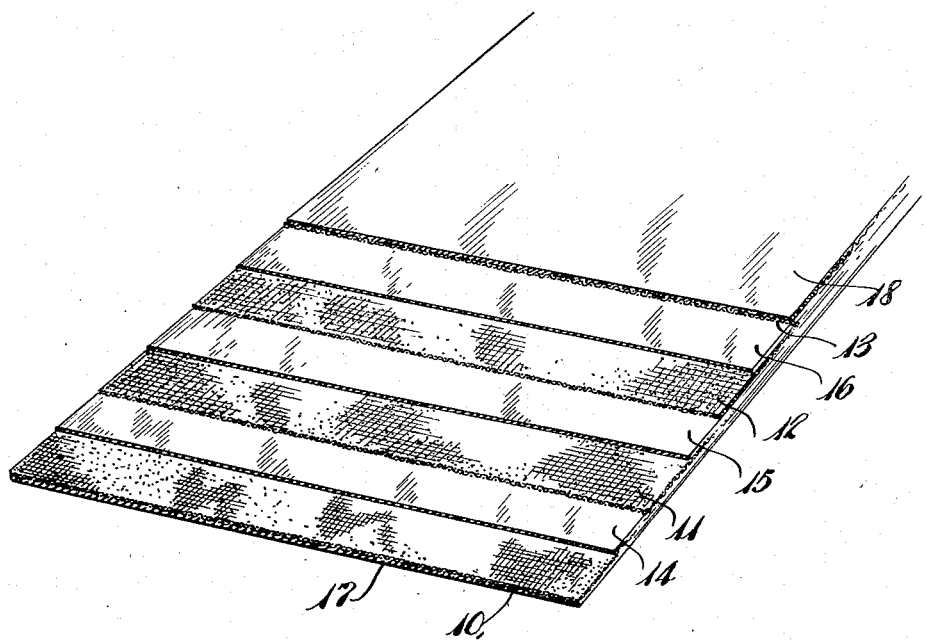
INVENTOR,
ALLAN B. MERRILL
BY Eakin & Avery
ATT'YS

Patented June 11, 1935

2,004,479

UNITED STATES PATENT OFFICE 2,004,479

TRANSMISSION BELT

Allan B. Merrill, Akron, Ohio, assignor to The B. F. Goodrich Company, New York, N. Y., a corporation of New York Application October 24, 1933, Serial No. 695,020

4 Claims. (Cl. 74—232)

This invention relates to transmission belts of the flat type, and is especially useful in the construction of belts subjected to forces tending to turn the margins of the belt.

In locations, such as the generator-driving transmission on electrically lighted trains, where turning of the trucks of the car affects the parallelism of the driving and driven pulleys, the pulleys are provided with flanges to maintain the belts in place on the pulleys. The combined effect of nonparallelism of the pulleys and the presence of the flanges tends to cause the margins of the belt to climb the flanges, causing lateral flexure of the belt. Where such belts are exposed under trains, moisture, oil and dust are deposited upon the belts, and the belts are subjected to extremes of temperature. Flexure of the belts laterally tends to soften the belts and to fray or open the edges thereof, allowing moisture and oil to deteriorate the belt.

The principal objects of this invention are to provide against excessive lateral flexure of the belt without equally increasing its longitudinal resistance to flexure, and to provide increased resistance to moisture and oil.

Other objects will appear from the following description and the accompanying drawing showing the preferred form of the invention.

Referring to the drawing, the belt is formed of successive plies of duck 10, 11, 12, and 13, superimposed upon each other and separated by plies of rubber composition 14, 15, and 16. The outer faces of the outside plies are protected by plies 17 and 18 of rubber composition. The belt is of the type known as a "raw-edged" belt, as it has been found that folded edges tend to start separation between the plies. Each of the plies of fabric comprises comparatively straight weft threads lying transversely of the belt and crimped warp threads lying longitudinally of the belt, thereby providing greater flexibility and elasticity of the belt longitudinally.

In order materially to stiffen the belt, especially laterally thereof, and at the same time to protect the plies against the influence of moisture and oil, at least some of the plies are impregnated with a material adapted to stiffen the fabric and to insulate the threads against moisture and oils. For this purpose I have found that the thermoplastic derivatives of rubber of resinous character disclosed in U. S. Patent No. 1,605,180 of Fisher issued November 2, 1926, may be used. As such materials interfere somewhat with the adhesion of the impregnated fabric to rubber as compared with the adhesion of rubber to rubber, I find it advisable to employ a mixture of the rubber derivative with pure rubber. As an example, the material resulting from the reaction of paraphenolsulfonic acid and rubber is milled together with an equal weight of smoked sheet rubber and the mixture is dissolved in a solvent such as benzol. The fabric is impregnated with the resulting solution and then dried.

Where the belt is a four ply belt, as shown in the drawing, the two inner plies are made from fabric impregnated with the stiffening material. Where a five ply belt is desired, alternate inner plies are impregnated.

The rubber layers 15 and 16 are calendered upon the impregnated plies. The other rubber layers 14, 17 and 18 are calendered upon the untreated plies 10 and 13.

The plies are assembled in the usual way and the belt vulcanized under pressure in a press. Where endless belts are desired, the material may be assembled around a drum and vulcanized thereon.

While both the warp threads, extending longitudinally of the belt, and the weft threads, extending laterally thereof, are equally impregnated with the stiffening material, the crimp in the warp threads permits them to flex more than the weft threads.

I claim:

1. A transmission belt comprising a plurality of superimposed plies of duck having plies of rubber composition therebetween, said plies of duck being formed of substantially straight weft threads extending transversely of the belt and crimped warp threads extending longitudinally thereof, at least one of said plies of duck being impregnated with a resinous derivative of rubber to stiffen the same.

2. A transmission belt comprising a plurality of superimposed plies of duck formed of substantially straight weft threads extending transversely of the belt and crimped warp threads extending longitudinally thereof and having plies of rubber composition therebetween, at least one of said plies of duck being impregnated with a reaction product of rubber and paraphenolsulfonic acid to increase the resistance of the belt to lateral flexure.

3. A transmission belt comprising a plurality of superimposed plies of duck formed of substantially straight weft threads extending transversely of the belt and crimped warp threads extending longitudinally thereof and having plies of rubber composition therebetween, at least one of said plies of duck being impregnated with a mixture of rubber and a rubber derivative of resinous character to increase the resistance of the belt to lateral flexure.

4. A transmission belt comprising a stiffening ply of duck formed with straight warp threads laid crosswise of the belt and impregnated with a resinous derivative of rubber, and a layer of rubber adhered thereto.

ALLAN B. MERRILL.